United States Patent
Götz et al.

(10) Patent No.: US 10,622,858 B2
(45) Date of Patent: Apr. 14, 2020

(54) ROTATING ELECTRICAL MACHINE AND SPECIALLY ADAPTED METHOD FOR PRODUCING SAID ROTATING ELECTRICAL MACHINE

(71) Applicant: Dr. Ing. h.c. F. Porsche Aktiengesellschaft, Stuttgart (DE)

(72) Inventors: Stefan Götz, Forstern (DE); Malte Jaensch, Bietigheim-Bissingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 125 days.

(21) Appl. No.: 15/813,595

(22) Filed: Nov. 15, 2017

(65) Prior Publication Data

US 2018/0152067 A1 May 31, 2018

(30) Foreign Application Priority Data

Nov. 30, 2016 (DE) .......................... 10 2016 123 068

(51) Int. Cl.
| | |
|---|---|
| *H02K 3/12* | (2006.01) |
| *H02K 15/00* | (2006.01) |
| *H02K 3/48* | (2006.01) |
| *H02K 15/02* | (2006.01) |
| *H02K 15/04* | (2006.01) |

(52) U.S. Cl.
CPC .................. *H02K 3/12* (2013.01); *H02K 3/48* (2013.01); *H02K 15/0081* (2013.01); *H02K 15/024* (2013.01); *H02K 15/0442* (2013.01)

(58) Field of Classification Search
CPC .......... H02K 3/12; H02K 15/02; H02K 15/04; H02K 3/48
USPC .................. 310/214, 215, 179–210
See application file for complete search history.

(56) References Cited

U.S. PATENT DOCUMENTS

| | | | |
|---|---|---|---|
| 4,048,713 A | * | 9/1977 | Hvass ..................... H01F 41/04 29/594 |
| 5,801,471 A | | 9/1998 | Hill |
| 6,252,327 B1 | | 6/2001 | Matsuzaki |
| 7,301,310 B2 | * | 11/2007 | Ganev ...................... H02P 9/48 290/46 |
| 7,600,311 B2 | | 10/2009 | Kreuzer et al. |
| 8,330,318 B2 | | 12/2012 | Saito et al. |

(Continued)

FOREIGN PATENT DOCUMENTS

| CN | 103959609 A | 7/2014 |
|---|---|---|
| DE | 102007034322 A1 | 1/2009 |

(Continued)

OTHER PUBLICATIONS

Notification of Reason for Rejection for Japanese Application No. 2017-228630, dated May 8, 2019, 4 pages.

(Continued)

*Primary Examiner* — Naishadh N Desai
(74) *Attorney, Agent, or Firm* — RatnerPrestia (57) ABSTRACT

A rotating electrical machine includes a rotor iron, a stator iron and conductor bars. An air gap separates the rotor iron from the stator iron. The stator iron has a slot and the conductor bars run in the slot. The conductor bars have a first profile in a first segment, the conductor bars have a second profile in a second segment and the first profile differs from the second profile. Also described is a method which is adapted for producing an electrical machine.

6 Claims, 7 Drawing Sheets

(56) References Cited

U.S. PATENT DOCUMENTS

| | | | |
|---|---|---|---|
| 2001/0011851 A1* | 8/2001 | Asao | H02K 3/12 |
| | | | 310/179 |
| 2004/0207284 A1 | 10/2004 | Neet | |
| 2006/0071573 A1 | 4/2006 | Fujita et al. | |
| 2007/0216253 A1* | 9/2007 | Shendi | H02K 1/165 |
| | | | 310/216.012 |
| 2010/0026132 A1* | 2/2010 | Ooiwa | H02K 3/12 |
| | | | 310/201 |
| 2012/0025660 A1 | 2/2012 | Patel et al. | |
| 2012/0274172 A1* | 11/2012 | Koga | H02K 3/12 |
| | | | 310/208 |
| 2014/0300239 A1 | 10/2014 | Takizawa et al. | |
| 2015/0311757 A1* | 10/2015 | Tamura | H02K 15/0421 |
| | | | 310/208 |
| 2016/0013692 A1 | 1/2016 | Wawrzyniak et al. | |
| 2016/0099616 A1* | 4/2016 | Hino | H02K 1/16 |
| | | | 310/216.043 |

FOREIGN PATENT DOCUMENTS

| | | |
|---|---|---|
| DE | 102012212637 A1 | 1/2014 |
| EP | 2991199 A1 | 3/2016 |
| JP | 2004048877 A | 2/2004 |
| JP | 2011147312 A | 7/2011 |
| JP | 2012186938 A | 9/2012 |
| JP | 2012253958 A | 12/2012 |
| JP | 2013138594 A | 7/2013 |
| JP | 2014023170 A | 2/2014 |
| JP | 2014023171 A | 2/2014 |
| JP | 2014033495 A | 2/2014 |
| JP | 2014057463 A | 3/2014 |
| WO | 0154254 A1 | 7/2001 |
| WO | 2014020385 A2 | 2/2014 |
| WO | 2014174658 A1 | 10/2014 |

OTHER PUBLICATIONS

German Search Report for German Application No. 10 2016 123 068.5, dated Sep. 1, 2017 with partial English translation, 14 pages.
Notification of Reason for Rejection for Japanese Application No. 2017-228630, dated Oct. 2, 2018, 3 pages.
Chinese Office Action for Chinese Application No. 201711205362.4, dated Jun. 21, 2019, with translation, 12 pages.

* cited by examiner

ROTATING ELECTRICAL MACHINE AND SPECIALLY ADAPTED METHOD FOR PRODUCING SAID ROTATING ELECTRICAL MACHINE

CROSS-REFERENCE TO RELATED APPLICATIONS

This application claims priority to German Patent Application No. DE 10 2016 123 068.5, filed Nov. 30, 2016, the contents of such application being incorporated by reference herein in their entirety.

FIELD OF THE INVENTION

The present invention relates to a rotating electrical machine. The present invention furthermore relates to a method which is adapted for producing an electrical machine.

BACKGROUND OF THE INVENTION

In electrical machine construction, any type and method of winding electrical conductors to form a coil is covered by the collective term coil winding technology. In this case, "coils" are not intended to be understood only as separate inductive passive components; rather, in the present context, the term covers all windings and winding materials that are suitable for generating or for detecting a magnetic field. The windings of actuators, in particular of the stator and rotor of a rotating electrical machine, are likewise called coils in the text which follows within this further meaning of the word.

The winding technology therefore substantially determines the properties of electromechanical assemblies which have windings. Said properties include the insulation resistance, the quality factor, the size required for a specific performance or magnetic force or else the magnetic stray field. Since the requirements in respect of energy efficiency according to the prior art increase greatly, there are, in particular, increasing demands for the development of components for electromechanical assemblies such as electric motors.

Winding operations in stators and/or in rotors are usually performed primarily with comparatively thin individual wires—typically with diameters of up to 2 mm—which are inserted into the openings in the stator or motor iron (slots) manually or by corresponding winding and pull-in machines. It is known to introduce bars, instead of individual wires, into the slots, to form said individual bars and then to connect, for example to weld, said bars at the ends to form a continuous winding. Since, according to the prior art, primarily short U- or V-shaped individual segments which are reminiscent of hairpins are used for this purpose, bar windings of this kind are sometimes called hairpin conductors in technical circles.

Bar windings provide various advantages over individual wire windings: whereas individual wire windings still require various manual steps during manufacture in spite of a high degree of automation, bar windings can be produced in a fully automatic manner. In this case, the bars usually have a rectangular cross section and are segmented into equal cross sections in the slot. Bar windings therefore allow better utilization of the slots than individual wires which, even with dense packing, leave empty spaces and cause a substantial loss of space due to insulation coating. Higher machine powers in small installation spaces can be achieved owing to the higher level of filling of the slots with copper (the so-called copper filling factor). Whereas filling factors of from 30% to 50% are common in the case of individual wires, even more than 80% can be achieved with bar windings. More reliable insulation both between the bars and also between bars and irons is possible owing to the well-defined surface and the relatively large dimensions of the hairpin or bar conductors. The degradation of the insulation is one of the most important aging mechanisms and central to the service life of electrical machines. In the case of U-shaped segments, the individual segments can be inserted into the slots on the end side during manufacture, as a result of which slots which are closed toward the air gap and are half open can be realized, this being difficult or even impossible in the case of individual wire windings with continuous wire, as explained in U.S. Pat. No. 8,330,318, which is incorporated by reference herein. If the electrical machine with a bar winding is operated in high rotation speed ranges, the losses of the electrical machine increase on account of high-frequency effects.

JP 2011 147 312 A, which is incorporated by reference herein, describes a stator winding of an electrical machine, wherein different winding cross sections are provided within the slots. In this case, the windings with a relatively small cross section are preferably situated further on the inside than the windings with a relatively large cross section.

US 2004 0207 284 A1, which is incorporated by reference herein, describes an electrical machine with a stator winding comprising radially arranged conductor segments with a rectangular cross section.

US 2012 0025 660 A1, which is incorporated by reference herein, describes an electrical machine with a stator winding having a large number of turns with a rectangular cross section. In this case, each turn consists of two sections, wherein the inner section of a turn is connected to an outer section of a turn in a non-adjacent slot.

US 2012 0274 172 A1, which is incorporated by reference herein, describes an electrical machine with a stator winding comprising a large number of line bundles, wherein the cross section of the line bundles is flexible. In this case, the line bundles are arranged such that adjacent line bundles are in contact.

US 2015 0311 757 A1, which is incorporated by reference herein, describes an electrical machine with a stator winding comprising a large number of coil conductors. In this case, the coil conductors can have different, in particular also curved, cross sections.

US 2016 0013 692 A1, which is incorporated by reference herein, describes a stator for an electrical machine with a large number of turns which are radially arranged and of which the cross section changes depending on their position.

U.S. Pat. No. 5,801,471 A, which is incorporated by reference herein, and U.S. Pat. No. 6,252,327 B1, which is incorporated by reference herein, disclose further prior art in respect of stator windings for electrical machines.

SUMMARY OF THE INVENTION

Described herein is a rotating electrical machine and also a method which is adapted for producing an electrical machine.

Bar windings with solid, generally rectangular conductor segments in central key ratios provide clear advantages over conventional individual wire windings, in particular at medium rotation speeds of, for example, 500 rpm. However, at high rotation speeds of, for example, 15,000 rpm, disadvantages of this technology become apparent, the knowledge of these disadvantages also forming the basis of this invention and being described below.

Therefore, bar windings have a central problem: intuitively, it can be assumed that the higher achievable slot filling factor would allow a lower winding resistance and therefore lower losses. However, this is true only for direct current. However, at relatively high frequencies, as are usual in a rotating machine, the losses actually increase. Although bar windings are usually clearly superior to individual wire windings in respect of their efficiency at low rotation speeds, the losses therefore usually increase greatly at high rotation speeds.

The reasons for this phenomena are high-frequency effects on account of the frequency, which increases with the rotation speed, both of the rotating field passing through the conductors in the slot and the usually sinusoidal control current which itself causes a magnetic field around itself.

There are two causes which create losses which increase with the rotation speed (increasing approximately quadratically): a first cause can be found in the so-called skin and proximity effects which primarily increase the effective resistance of the conductors and as a result indirectly generate relatively high losses since the current has to bridge a relatively high resistance. A second interference factor has proven to be eddy currents in adjacent conductors which directly cause increased losses. One objective of the invention is to reduce these losses at high rotation speeds at the cost of higher losses at low rotation speeds.

The magnetic fields mainly occur close to the slot opening. Accordingly, said two effects are the greatest there. The reasons for this are both the fields of the rotor poles passing by, which fields are injected into the open slot, and also the magnetic fields of the winding itself, which magnetic fields, on account of the air gap and its low permeability, can no longer be kept completely out of the slot and concentrated in the iron, but rather already run, preferably transversely, through the slot beforehand. In particular, eddy currents lead to a current density which increases with an increasing proximity to the slot opening owing to additional currents. The eddy currents run perpendicular to the generating magnetic alternating fields, form usually local ring currents similar to eddying in a flow and add up to the conventional winding current. The eddy currents, in respect of their amplitude, tend to be considerably smaller than the desired and externally impressed winding current. However, since the resistive losses increase quadratically with the current density, any additional current has a disproportionate effect on the losses. The eddy current losses therefore generally increase at least quadratically with the frequency (and therefore the rotation speed) and the current intensity (and therefore the torque of the machine).

The abovementioned shifting effects (skin and proximity effect), which shift the entire current cross section such that it, as it were, deviates from its own magnetic field, additionally act independently of the eddy currents. This can likewise be seen as minimizing the total magnetic field energy or as avoiding high inductances of any current element and therefore forming the lowest complex resistance. Owing to the current concentration in the cross section, this effectively leads to a real increase in resistance and consequently higher losses. Here, the shifting of the winding current also generally takes place in the cross section in the direction of the air gap. As a result, the losses and waste heat close to the air gap increase unusually severely locally.

The high-frequency effects on which said losses are based increase, in particular, with the conductor cross section in the slots. This therefore gives rise to the dilemma that an increase in the cross section, which is intuitively thought to reduce the resistance, has a disadvantageous effect at high rotation speeds.

Known countermeasures according to the prior art, such as the use of hairpin conductors with a complicated surface structure, opening a considerable portion of the slot close to the air gap where high magnetic field densities occur, or partially closing the slot opening for displacing stray fields out of the slot into the resulting partial iron path, lead to the enormous disadvantages of an increasing ratio of total surface to total cross section of all conductors of a slot, additional empty space and therefore a falling slot filling factor. These measures mistake the cause of the additional losses. For example, electromagnetic fields with a plurality of sources rather lead both to the higher resistance and also to the eddy current losses: the rotor field of the rotor poles rotating past the slot is injected into the slot. This effect can be at least reduced by partially closing the slot opening. These stray fields in the slot generally occur with a high magnetic rotating field component. The field of the alternating current of the conductors in the slot itself contributes to the above losses. Each conductor segment influences both the current flowing in itself and in all other conductor segments in the slot. A unidirectional alternating field component usually dominates in this magnetic field component, provided that conductors of a plurality of phases with complicated spatial distribution in the slot are not used.

Rotating fields differ from alternating fields inasmuch as their profile is not constant and therefore the induced current path is not temporally constant either, as in the case of alternating fields. However, rotating fields can always be described by a plurality of alternating fields, which are perpendicular to one another, generally of a different frequency and/or phase. In particular, the effect of the two fields is not identical in all conductors of a slot. In the case of both field components, the greatest field strengths generally occur close to the slot opening, whereas they virtually disappear at the slot base. Therefore, both the effective resistance and the high-frequency losses are greatest close to the slot opening. The reason for this concentration of losses is primarily the air gap, and to a lesser extent the rotor field.

Therefore, for two alternative paths i and j through the same conductor with a non-negligibly large cross section, $Z_i \neq Z_j$ holds true, for example. In the case of two conductor segments in one slot, which conductor segments are connected electrically in parallel, the current is displaced into that with the lower resistance as a result. Given electrically parallel interconnection, although one segment may have a very low resistance to the current, this is more than overcompensated for by the adjoining high-impedance segment. Therefore, in both cases, the total resistance is higher than that which would result with a uniform current distribution. A similar argument can be made in respect of the induced current loops for eddy currents. The invention therefore recognizes that forcing a more uniform current distribution is advantageous. Whereas this is generally not necessary at the slot base on account of the low field strengths, a measure according to aspects of the invention should primarily start in the vicinity of the air gap.

The invention therefore involves configuring the form of the conductors in cross section depending on the position in a slot. Since, in particular in the case of alternating fields, the induced electrical field and current profiles in the conductor itself and adjacent conductors of a slot can be exactly predicted, conductors can be segmented such that they minimize the power loss. Since an induced electrical field and associated current profile are always perpendicular to the magnetic field lines, optimum segmentation interrupts precisely that field and/or current path. The separating lines between two conductors and consequently the surface thereof therefore follows the profile of the magnetic field lines as far as possible according to aspects of the invention.

The forming of the electrical conductors of a slot according to the local magnetic field conditions involves two aspects. With an increasing intensity of the magnetic field (often illustrated by the concentration of the field lines), the extent of the segments in the slot cross section perpendicular to the magnetic field lines should decrease in order to suppress the current flow and field build-up. The form of the conductors should follow the field lines in the horizontal direction and therefore the smallest possible field should flow through. Since conductors which are segmented according to aspects of the invention are used, dedicated segments can be used, depending on the position, and combined with other segments in order to form a continuous conductor loop which has, for example, thin and thick sections.

In this case, a specific embodiment of the invention is based on skilled local segmentation into conductors with different cross-sectional areas. In locations with high alternating fields, the conductor segments should be correspondingly finely subdivided in order to avoid undesired current flows on account of magnetic fields. The insulating boundary area between two conductors, which boundary area can be formed either by an insulator (insulation paper, insulation coating, oxidation) or at least a poorly conductive barrier (considerably more poorly conductive than the copper in the longitudinal direction along a plurality of turn sections), should be made as far as possible transversely to the eddy current path or the displacement direction without the segmentation. This is provided, for example (but not exclusively), with a profile of the boundary areas along the magnetic field direction. Since the magnetic flux density is generally highest at the slot opening, the most fine segmentation would also generally be expedient there for virtually all types of machine.

Conventional electrical machines usually have magnetic field ratios of the kind such that, in line with the approach according to aspects of the invention, the conductor segments should become increasingly thin in the direction of the slot opening and of the air gap. In the simplest case, the segments can have a rectangular cross section, wherein at least one edge runs approximately perpendicular to the slot walls. In a particular embodiment, the boundary between two segments follows the magnetic field which runs virtually ideally locally horizontally close to the slot base and has a curvature, which is directed to the slot base, toward the air gap.

The segments for bar windings are usually produced directly during manufacture from profiled rods by cutting said profiled rods to length before the bending step. Producing segments which can be individually formed requires either a forming process, for example rolling, or a large number of different profiled rod blanks. In a particular embodiment, only two or three different cross-sectional forms can accordingly be used, which are accordingly combined in order to find a compromise between manufacturing expenditure and performance of the electrical machine.

Therefore, one advantage of the machine is its losses which are reduced in relation to conventional machines owing to the minimization of the high-frequency effects.

Further advantageous refinements of the invention are specified in the dependent patent claims. Therefore, there can be a large number of different embodiments of bars—for example curved, rectangular or horizontally segmented bars of different sizes—along the rotation axis of the electrical machine. A curvature can be provided, for example, preferably symmetrically to a radial axis. In this case, the curvature can be made in both directions and the extent of curvature can be different depending on the distance from the air gap. In particular, the shaping, comprising in particular the form of the surfaces, and the size of the cross section, both covered by the term profiling in the text which follows, can follow the vectorial magnetic field profile or the vectorial magnetic flux profile at the corresponding location in the slot. The spatial profile of the vectorial magnetic field or of the vectorial magnetic flux can preferably be ascertained when designing and calculating the electrical machines using known calculation methods, for example the finite element method (FEM), the finite difference method (FDM) or comparable mathematicophysical approaches. According to aspects of the invention, the respective profiles of the conductor bars can be accordingly formed such that the vectorial magnetic flux which is projected onto the respective local surface normal of at least one of the surfaces of at least one conductor bar is minimal. The profiles of the conductor bars are preferably formed such that the vectorial magnetic flux density which is projected onto the respective local surface normal of the two surfaces, which are approximately parallel to the slot base, of at least one conductor bar is minimal.

BRIEF DESCRIPTION OF THE DRAWINGS

Exemplary embodiments of the invention are illustrated in the drawings and will be described in greater detail in the text which follows.

DETAILED DESCRIPTION OF THE INVENTION

Figure 1:
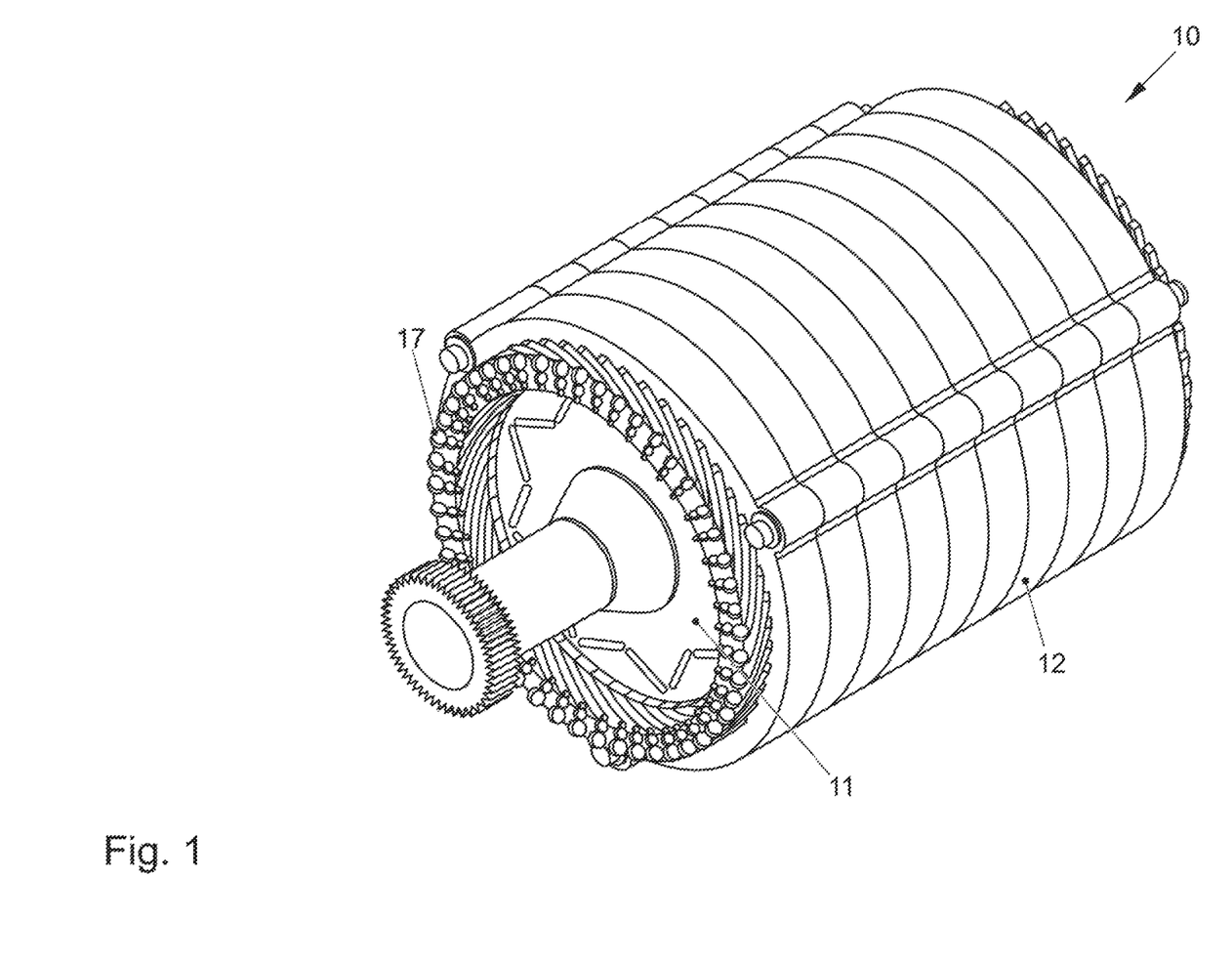
FIG. 1 shows a first electrical machine comprising a stator iron (12) and a rotor iron (11).

FIG. 1 shows the mechanical design of an electrical machine (10) having a rotor iron (11), a stator iron (12) and a stator winding comprising a plurality of conductor bars (17).

Figure 2:
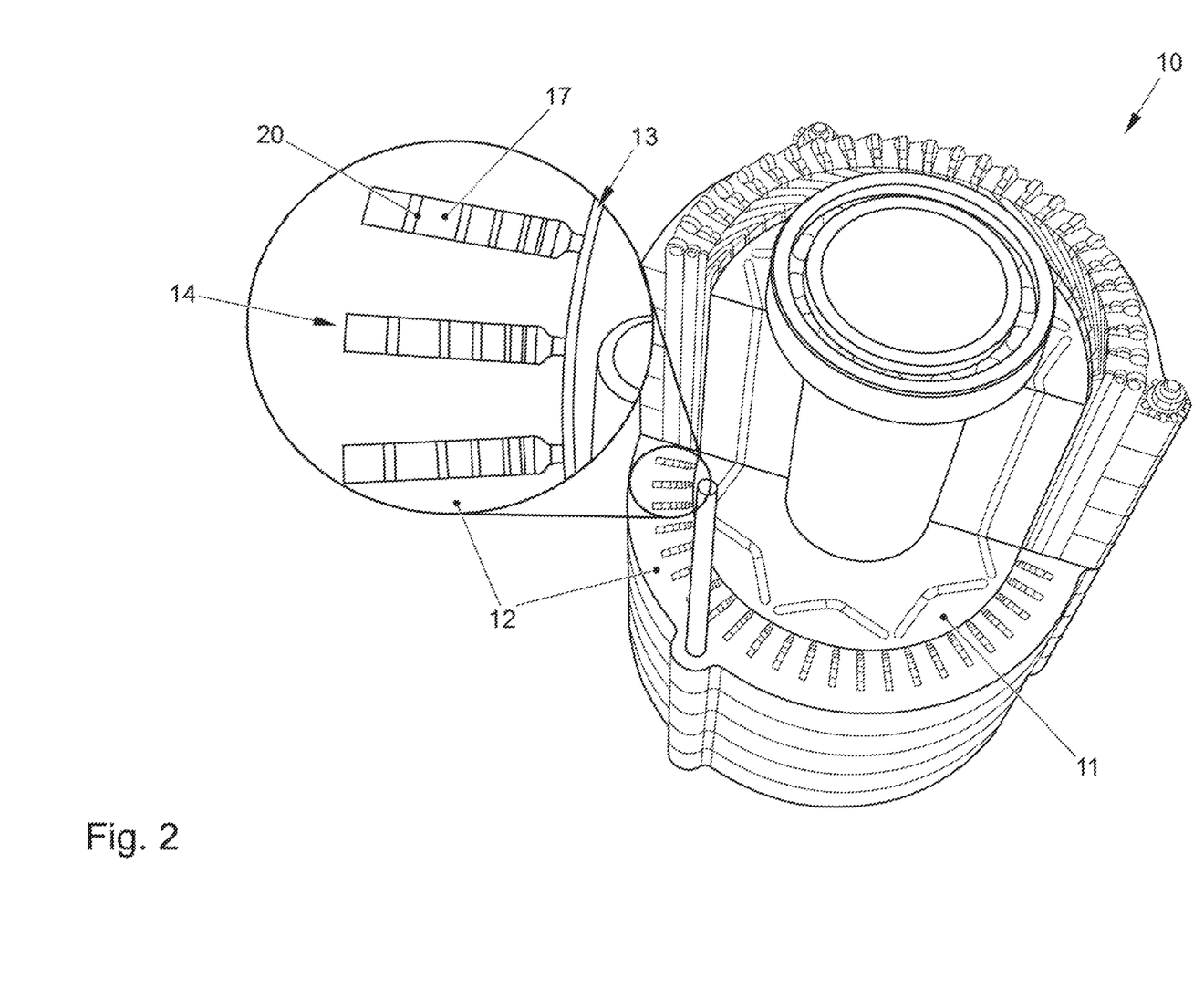
FIG. 2 shows a section through the machine.

FIG. 2 illustrates a section through the machine. The slots (14), illustrated on an enlarged scale, include conductor bars (17) of different cross sections and/or different curvatures. By way of example, the cross section of the conductor bars (17) decreases toward the air gap (13).

Figure 3:
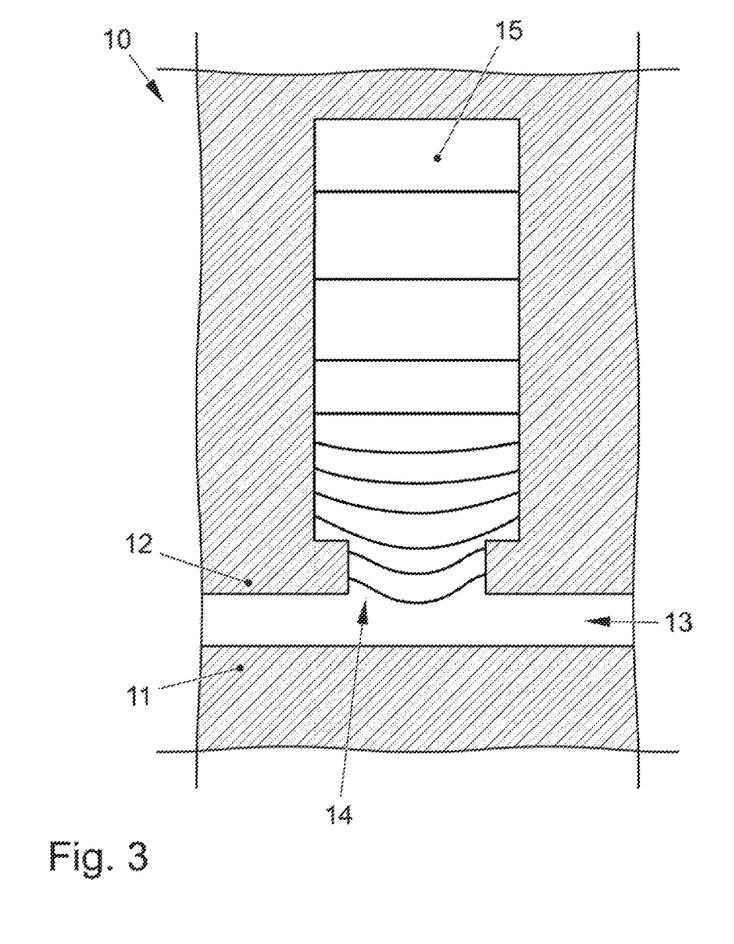
FIG. 3 shows the, in regions, longitudinal section through a second electrical machine without stator windings.

FIG. 3 illustrates the magnetic alternating field profile (15) in a slot (14) of the stator iron (12) of a rotating electrical machine (10).

In this case, the stator iron (12) is separated from the rotor iron (11) of the machine (10) in an initially conventional manner by an air gap (13). In this context, the term "air gap" is to be understood, in accordance with the terminology customary in electrical engineering, in the sense of an intermediate space which is distinguished only by the absence of ferromagnetic material but not necessarily by its possible air content. Therefore, non-ferromagnetic rivets, foils or powder metallurgical composite materials of which the intermediate spaces are sometimes called "distributed air gap" in technical circles can equally be used.

Figure 4:
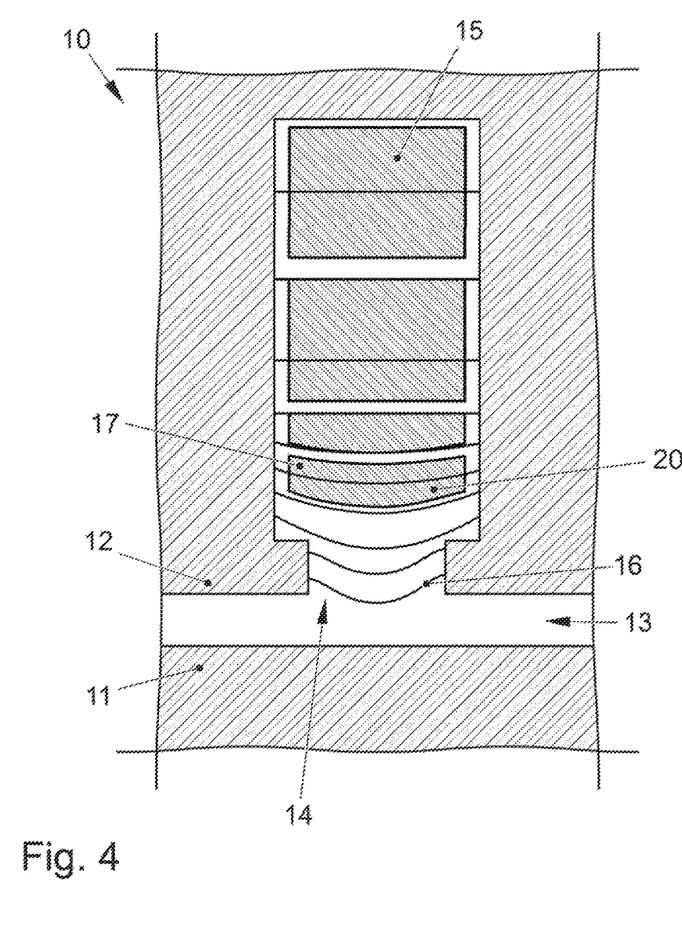
FIG. 4 shows a corresponding longitudinal section through the machine with stator windings.

FIG. 4 shows, on the basis of this alternating field profile (15) by which the magnetic flux close to the slot gap is increasingly deflected toward the rotor iron (11) (reference symbol 16), the forming according to aspects of the invention of the conductor bars (17) with surfaces parallel to the profile of the alternating field component. Here, the cross-sectional area content of individual conductor bars (17) is inversely related to the field strength at their site of installation. Specifically, the conductor bars (17) are designed, for example, for the same energy loss at an identical current.

Figure 5:
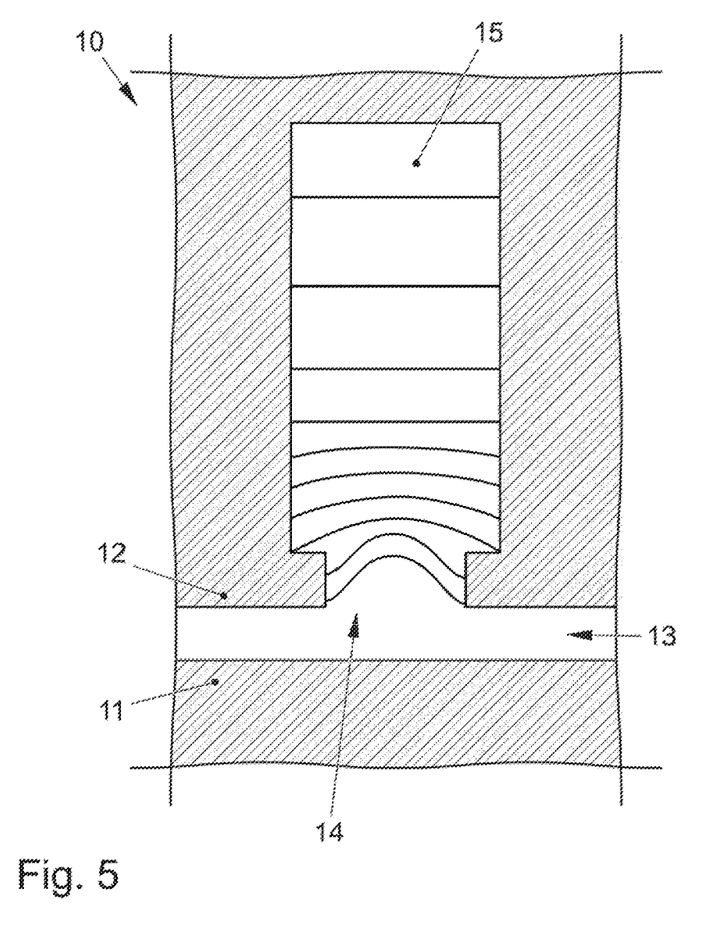
FIG. 5 shows the, in regions, longitudinal section through a third electrical machine without stator windings.
Figure 6:
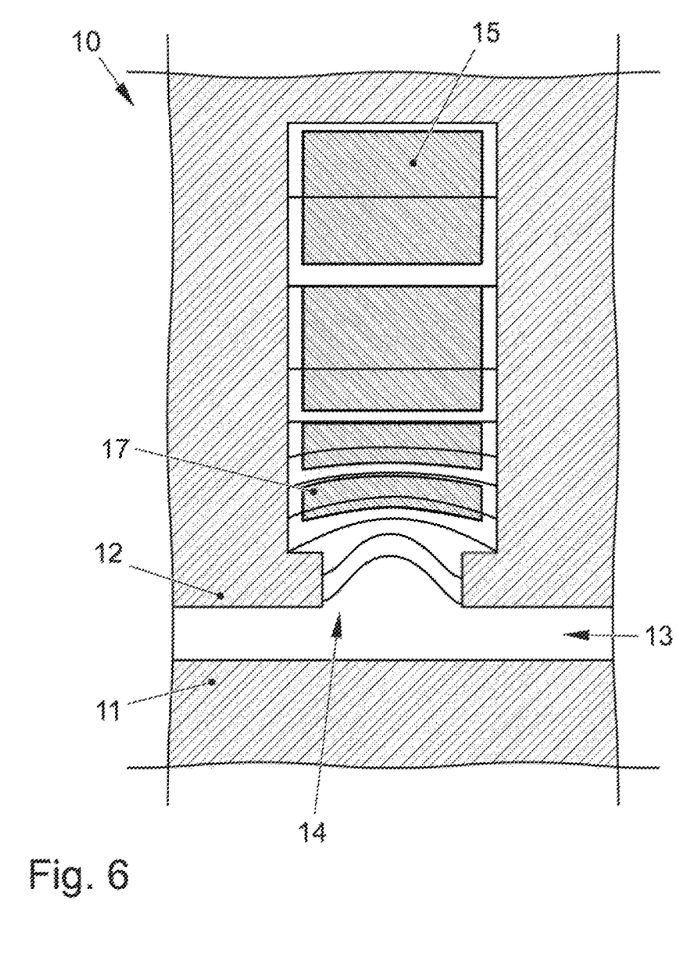
FIG. 6 shows a corresponding longitudinal section through the machine with stator windings.

Looking at FIGS. 5 and 6 together explains the structural principle according to aspects of the invention when it is transferred to a second electrical machine (10) of which the alternating field which is injected by the rotor iron (11) is impressed by a convex profile of its field lines. In this case too, the content of the cross-sectional area of individual conductor bars (17) is substantially inversely related to the field strength at their site of installation.

Figure 7:
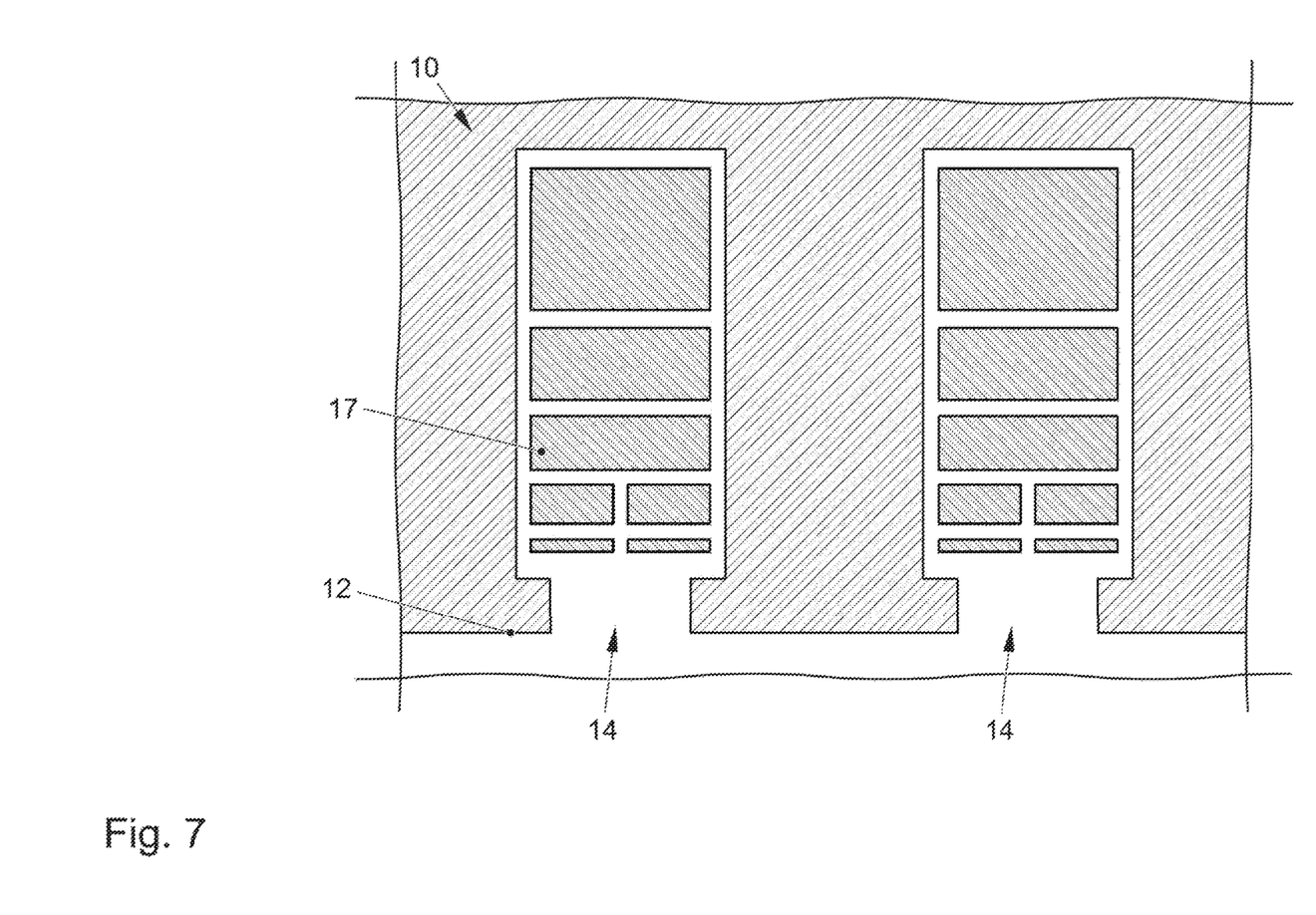
FIG. 7 shows the extended longitudinal section through a fourth electrical machine.

FIG. 7 illustrates, by way of example, segmentation in the horizontal direction, in accordance with the figure, for reducing the vertical components of a rotating field. Rotating fields of this kind have the disadvantage that they do not have a temporally fixed profile which varies only in its amplitude. However, rotating fields of this kind can be subdivided into two to three alternating field components. In this case, two alternating field components, specifically a, in accordance with the figure, horizontal and a vertical alternating field in the interior of the slot (14) are typically sufficient for modeling the alternating field components of the rotating field. The above-described method can be used not only for segmenting the, in accordance with the figure, vertical alternating field component but rather also can be transferred to the horizontal alternating field component. This produces a second segmentation direction which should be observed at the same time and generally runs approximately perpendicular to the other segmentation direction. Rotating fields of the described type can be produced, for example for the stator field given a highly varying reluctance depending on the rotor position, by strong rotor stray fields which periodically occur during operation or by superimposition of non-phase-identical rotor and stator fields in the slot (14).

Exemplary design criteria for cross sections of the individual paths in a group of parallel paths can be found in the following list:
1. identical effective resistance at frequency $\omega$;
2. identical power loss at frequency $\omega$;
3. identical power loss density at frequency $\omega$;
4. limiting the percentage deviation in the resistance of the paths within a prespecified frequency band;
5. achieving a similar increase in resistance $dR/d\omega$ or increase in loss $dW_{loss}/d\omega$ at frequency $\omega$;
6. division in such a way that displacement of the current into one of the two paths at frequency $\omega$ is suppressed;
7. reducing the losses at relatively high rotation speeds, slight increase at low rotation speeds; and
8. minimizing the system losses for a given load spectrum or a given drive cycle.

According to aspects of the invention, the profile of at least one conductor bar (17) in at least one slot (14) can be matched to the vectorial magnetic field profile or the vectorial magnetic flux profile of the magnetic alternating field (15) flowing through the slot in such a way that currents induced by the magnetic alternating field (15) can be effectively reduced in the at least one conductor bar (17). The profile of the at least one conductor bar (17) is preferably formed such that the vectorial magnetic flux density which is projected onto the respective local surface normal of at least one of the surfaces (20) of the at least one conductor bar is minimal, so that consequently the at least one surface (20) runs substantially tangentially to the local direction of the vectorial magnetic flux. At least 50% of the at least one surface (20), particularly advantageously more than 75%, preferably run tangentially to the local direction of the vectorial magnetic flux.

Furthermore, according to aspects of the invention, at least two surfaces (20), which are situated approximately opposite one another, of at least one conductor bar (17) can follow the vectorial magnetic flux density in such a way that the at least two surfaces (20), which are situated approximately opposite, run largely tangentially to the local direction of the vectorial magnetic flux. Since, according to Faraday's law of induction, electrical fields which are induced by the magnetic field and are ultimately responsible for eddy currents and current displacement effects always run perpendicular to the temporal change in the vectorial magnetic flux, a surface which runs along the local vectorial magnetic flux ensures, at least in the case of magnetic alternating fields, that the induced electrical field runs perpendicular to the surface and therefore there is no closed current path for a by the induced electrical field on the surface and these therefore do not occur locally.

Figure 8:
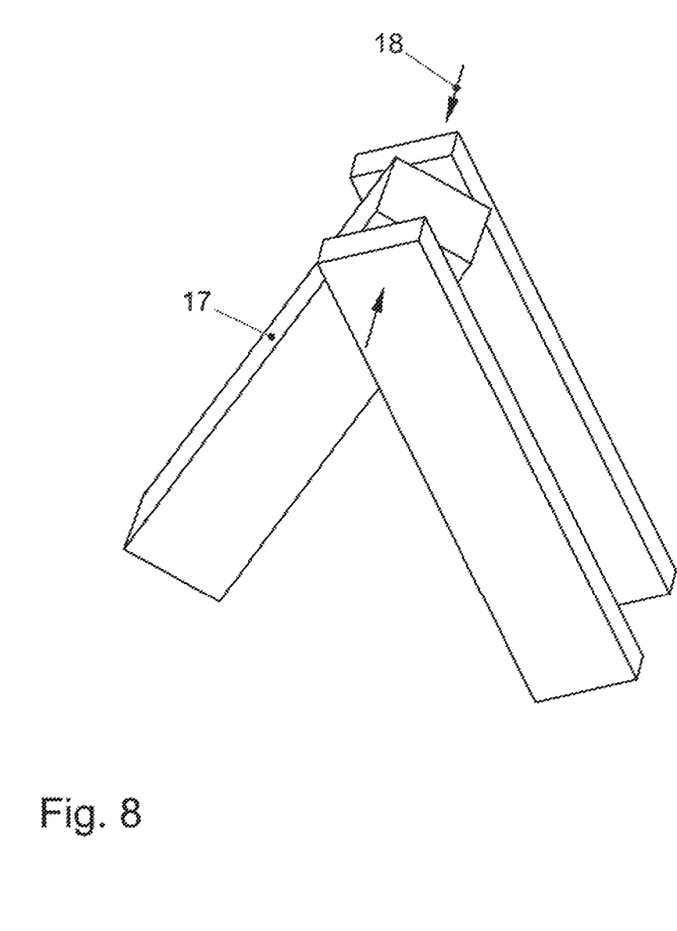
FIG. 8 shows the enlarged view of a plurality of segments of a first conductor bar in the region of a connecting point.
Figure 9:
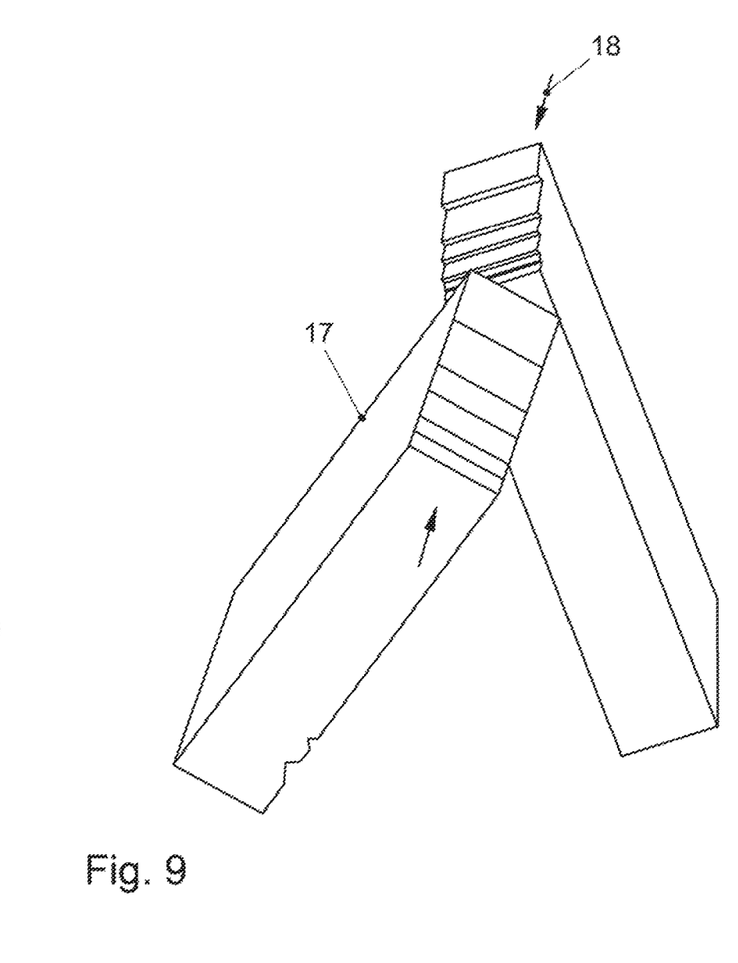
FIG. 9 shows the perspectively corresponding view of a plurality of segments of a second conductor bar.

FIGS. 8 and 9 illustrate a connection technique according to aspects of the invention for the transition of segments with unequal cross sections and of individual paths into parallel paths. A connection (18) can accordingly be made, for example, by welding, primarily tungsten inert gas welding (gas tungsten arc welding, GTAW; tungsten inert gas, TIG) and resistance welding. Furthermore, hard-soldering or clamping are feasible, without departing from the scope of the invention. In this way, an electrically conductive connection (18) can be established between more than two segments of different cross sections or between all subdivisions of the segments.

Figure 10:
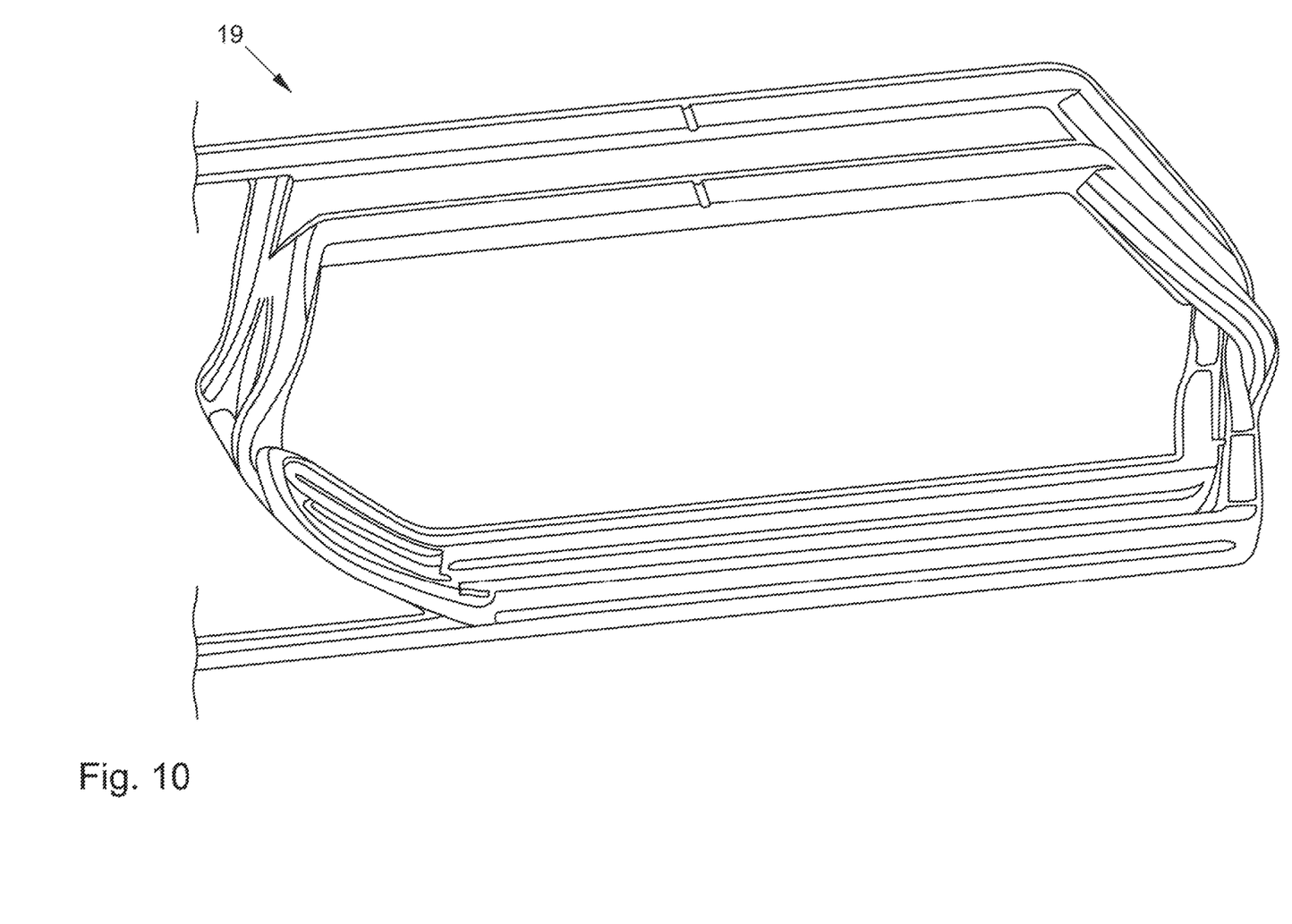
FIG. 10 shows the perspective view of a conductor loop.

Even though the above embodiments relate primarily to wave windings, the operating principle of the invention can be transferred to lap windings. FIG. 10 illustrates the use according to aspects of the invention of pre-segmented coil elements for lap windings. Relatively long conductor segments with more than two slot sections allow more complex connections of the subdivisions of the segment in virtually any desired combinations of series and parallel connections here. In particular, it is possible to connect in parallel a plurality of thin subdivisions which are situated close to the air gap (13) and, in turn, form a series connection with large sub-segments which are further seated on the slot base.

This configuration provides the advantage that, in spite of different cross sections of the individual subdivisions of the segment, similar effective cross sections are produced by the parallel and series connection, and therefore optimal resistance ratios can be created with the available copper.

What is claimed is:

1. A rotating electrical machine comprising:
   an iron rotor core;
   an iron stator core having a plurality of slots, each respective slot having a slot gap which faces the iron rotor core and a slot base which is averted from the iron rotor core, the slot gap being larger in cross-section than the slot base;
   a first set of first conductor bars and a second set of second conductor bars running in each respective slot, wherein:
      the first conductor bars of each respective slot have a first profile in a first segment formed of the slot gap and a lower portion of the slot base,
      the second conductor bars of each respective slot have a second profile in a second segment formed of an upper portion of the slot base,
      the first profile differs from the second profile,
      the first profile of each first conductor bar includes a respective curved surface that curves with respect to a radial axis of the respective slot,
      a respective extent of curvature of each respective curved surface sequentially increases from the lower portion of the slot base to the slot gap;
      the second profile of each second conductor bar is a polygon, and
      a respective cross-sectional area of each second conductor bar sequentially increases from the upper portion of the slot base towards the lower portion of the slot base; and
   an air gap separating the iron rotor core from the iron stator core.

2. The rotating electrical machine as claimed in claim 1, herein the respective curved surface of the each first conductor bar is such that, when a magnetic alternating field passes through the respective slot, the magnetic alternating field has a uniform flux density at the respective curved surface.

3. The rotating electrical machine as claimed in claim 1, wherein the first segment and the second segment are at a corresponding distance from the iron rotor core.

4. The rotating electrical machine as claimed in claim 1, wherein the respective cross-sectional area of each second conductor bar is selected such that the second conductor bars have a corresponding effective resistance when a magnetic alternating field passes through the respective slot at a given frequency.

5. The rotating electrical machine as claimed in claim 1, wherein the respective cross-sectional area is selected such that a corresponding power loss is implemented in the second conductor bars when a magnetic alternating field passes through the respective slot at a given frequency.

6. The rotating electrical machine as claimed in claim 1, wherein the respective cross-sectional area is selected such that the second conductor bars have a corresponding power loss density when a magnetic alternating field passes through the respective slot at a given frequency.

* * * * *